(12) United States Patent
McCormick

(10) Patent No.: US 6,593,028 B1
(45) Date of Patent: Jul. 15, 2003

(54) SEPARATOR ENVELOPE FOR SWELLING IN ELECTROCHEMICAL CELLS

(75) Inventor: Richard McCormick, East Aurora, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 96 days.

(21) Appl. No.: 09/708,376

(22) Filed: Nov. 8, 2000

(51) Int. Cl.[7] ............................................... H01M 2/02
(52) U.S. Cl. .................... 429/131; 429/231.95; 429/163
(58) Field of Search ........................... 429/231.95, 129, 429/131, 132, 139, 136, 146, 163, 169, 174

(56) References Cited

U.S. PATENT DOCUMENTS

| | | |
|---|---|---|
| 2,257,489 A | 9/1941 | Wells |
| 2,570,677 A | 10/1951 | Honey et al. |
| 2,870,235 A | 1/1959 | Soltis |
| 2,934,585 A | 4/1960 | Zahn |
| 3,013,100 A | 12/1961 | Mendelsohn et al. |
| 3,264,139 A | 8/1966 | Solomon et al. |
| 3,663,721 A | 5/1972 | Blondel et al. |
| 4,788,113 A | 11/1988 | Böhle et al. ................. 429/139 |
| 5,558,952 A * | 9/1996 | Knauer ........................ 429/139 |
| 5,716,729 A | 2/1998 | Sunderland et al. .......... 429/66 |
| 5,750,286 A | 5/1998 | Paulot et al. ................ 429/211 |
| 5,905,001 A * | 5/1999 | Elliott et al. ................ 429/169 |

* cited by examiner

Primary Examiner—Randy Gulakowski
Assistant Examiner—Monique Wills
(74) Attorney, Agent, or Firm—Michael F. Scalise

(57) ABSTRACT

A casing having substantially parallel side walls connected by a curved end wall receives a cathode electrode having substantially parallel opposed side walls connected by end walls. The cathode electrode is enclosed by a separator envelope that substantially conforms to an upper surface of the electrode. Accordingly, along the perimeter of the electrode the separator has a non-uniform spacing with respect to the edges of the electrode. The upper surface of the separator is disposed in a relatively closely spaced relationship with the electrode proximate the header and lid where welding takes place. At the opposite end of the cathode electrode there is space inside the casing that provides for electrode swelling. Since no welding operations take place there, the separator is provided in a relatively loose relationship with respect to the cathode to accommodate swelling during discharge.

15 Claims, 5 Drawing Sheets

SEPARATOR ENVELOPE FOR SWELLING IN ELECTROCHEMICAL CELLS

FIELD OF INVENTION

The present invention relates to the art of electrochemical cells, and more particularly, to a new and improved separator envelope for accommodating the swelling of a cathode electrode in high energy density electrochemical cell.

BACKGROUND OF THE INVENTION

During normal discharge, the cathode of a lithium electrochemical cell, including but not limited to Li/SVO and Li/CF$_x$ cells, exhibits swelling. The separator, which is used to prevent physical contact between the anode and the cathode, adjusts to the swelling while maintaining structural integrity. Accordingly, conventional separator envelopes are fabricated with excess material distributed evenly around and about the volume of the covered electrode. This type of design is adequate when there is substantial clearance between the covered electrode and the header or lid of the cell. However, when the covered electrode and the case lid are in a closely spaced relationship, the separator may melt or become compromised during welding operations as the lid is being hermetically sealed to the rest of the casing. This happens because the casing and the lid readily conduct heat to the separator proximate the welding zone.

Accordingly, what is needed is a separator envelope that is suitable for cells having minimal or a closely spaced clearance between the electrode assembly and the inside surface of the case, and especially in areas that are near welding zones and which maintains its structural integrity throughout the discharge life of the cell.

SUMMARY OF THE INVENTION

Generally described, the present invention meets the above-mentioned need by providing a separator envelope that is characterized by a non-uniform offset from the covered electrode. This non-uniformity refers to the clearance around the entire body of the electrode. In other words, the clearance is not equidistant between the separator envelope and the covered electrode. Excess separator material is disposed in areas where there is adequate clearance from casing weld zones while the separator is in a relatively closely spaced relationship with the covered electrode in areas where there is less clearance from weld zones, for example proximate the casing lid.

In a preferred embodiment of the present invention, a casing having substantially parallel side walls connected by a curved end wall receives a cathode electrode having substantially parallel opposed side walls connected by end walls. In another preferred embodiment, the casing has a cylindrical shape housing a jellyroll electrode assembly. In either case, the cathode electrode is covered by a separator envelope that conforms in a relatively closely spaced relationship to the contour of the electrode body, including adjacent to the casing weld zones, such as adjacent to the lid. Distant from the weld zones, the separator envelope has excess material and is in a relatively loosely spaced relationship with the covered electrode. This loosely spaced relationship accommodates electrode swelling during cell discharge. Accordingly, the separator envelope of the present invention is preferably spaced from the covered electrode in a non-uniform manner. While the separator configuration of the present invention has been described with respect to the cathode of a primary cell, it is equally applicable for both the anode electrode and the cathode electrode of a secondary or rechargeable cell.

These and other objects of the present invention will become increasingly more apparent to those skilled in the art by reference to the following description and to the appended drawings.

DESCRIPTION OF THE PREFERRED EMBODIMENTS

Figure 1:
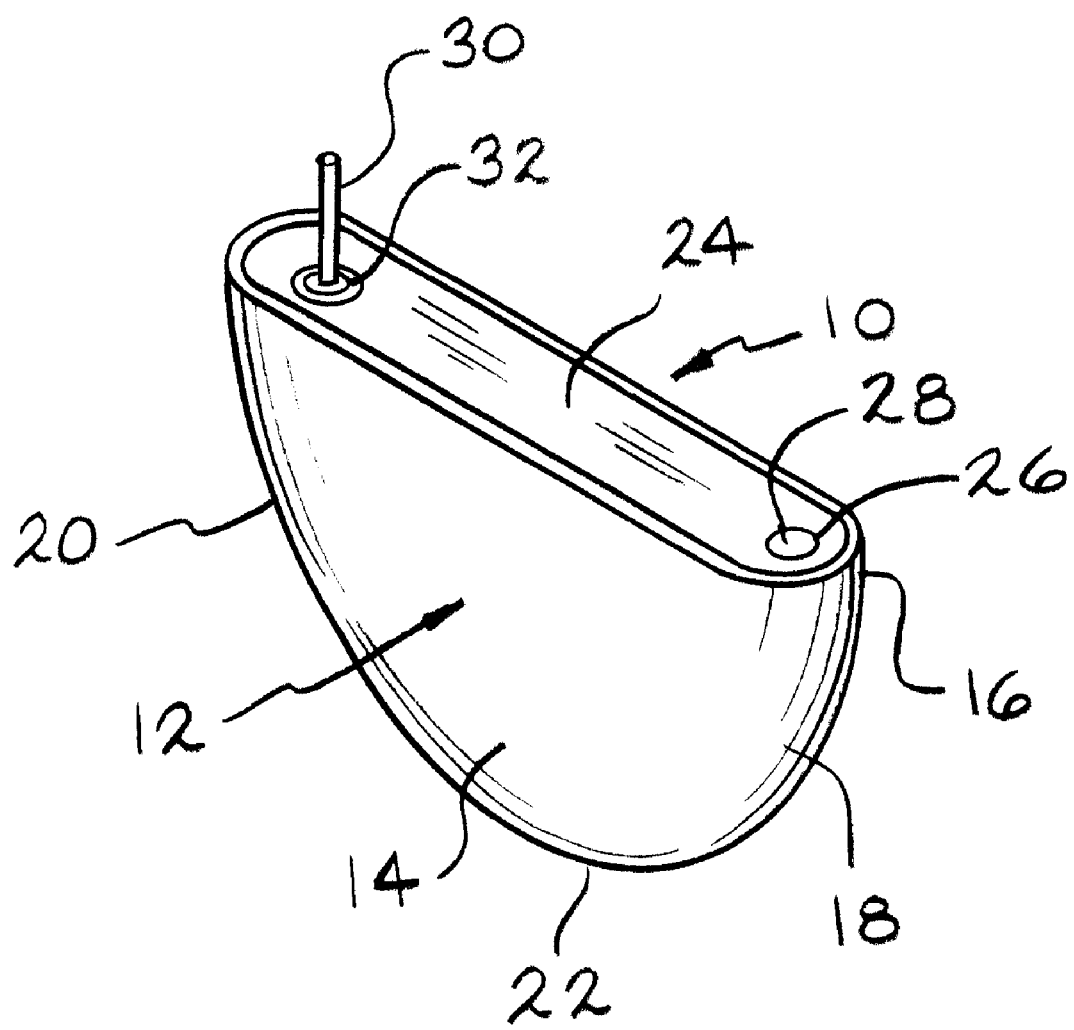
FIG. 1 is a perspective view of an exemplary prismatic cell 10.

Throughout the various drawings showing the electrochemical cell of both the prior art and the present invention, like parts, components and structure are given like reference numerals.

At the outset, it should be pointed out that the present invention is described and illustrated with respect to the cathode of a primary electrochemical cell housed inside a prismatic casing. However, those skilled in the art will readily recognize that the present separator configuration is readily adapted to many different types of cell housings including cylindrical, button-type and prismatic. Also, the present separator configuration is readily adapted to covering the cathode of a primary cell and both the anode and the cathode of a secondary cell.

Figure 4:
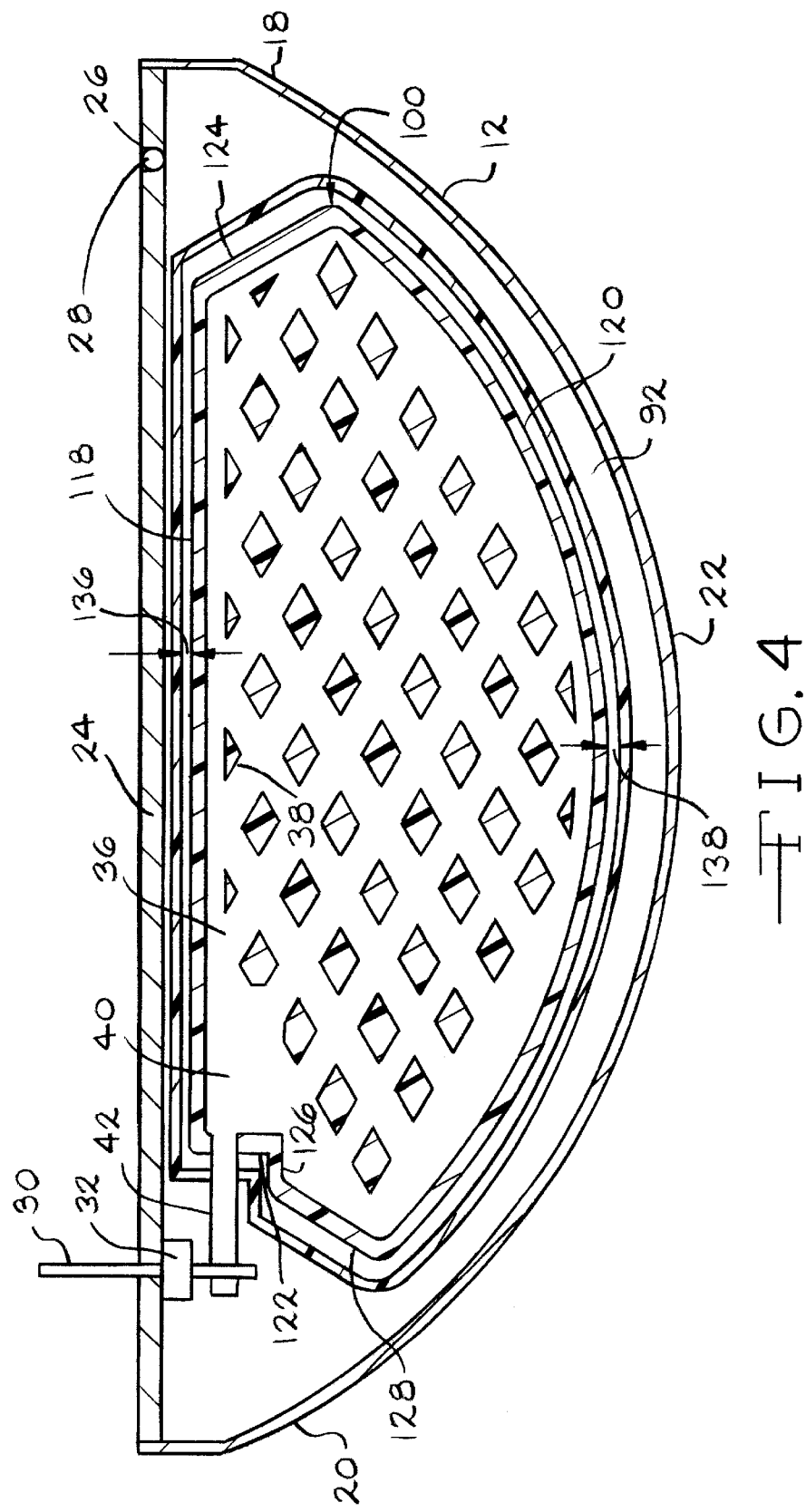
FIG. 4 is an enlarged cross-sectional end elevation view of the prismatic cell of the present invention
Figure 5:
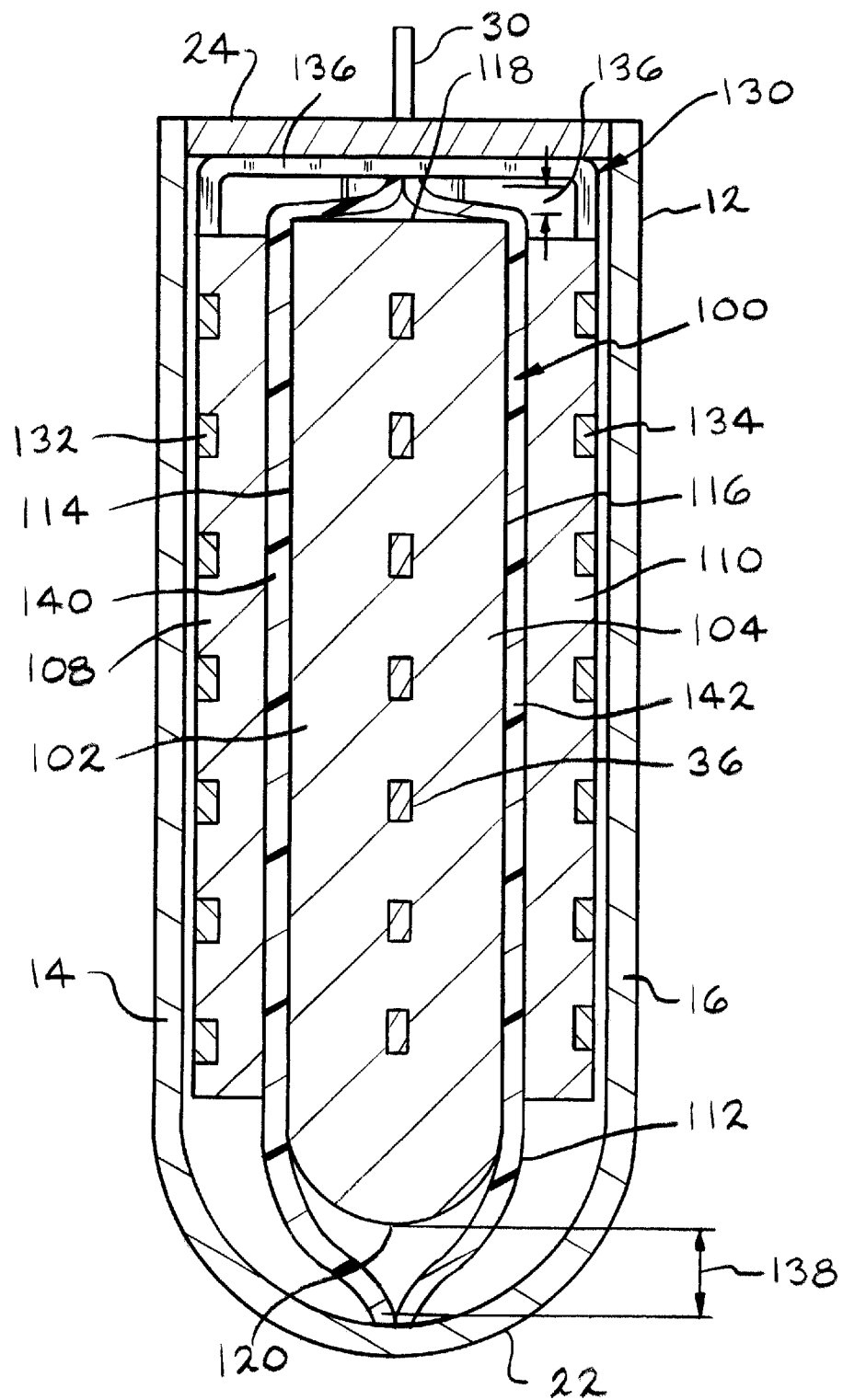
FIG. 5 is an enlarged cross-sectional end elevation view of the prismatic cell shown in FIG. 4.

A perspective view of an exemplary prismatic electrochemical cell 10 design is shown in FIG. 1 including a casing 12 having spaced-apart front and back side walls 14 and 16 joined by curved end walls 18 and 20 and a curved bottom wall 22. The open top of casing 12 is closed by a lid 24. Lid 24 has an opening 26 that is used for filling the casing 12 with an electrolyte (not shown) after the cell components have been assembled therein and the lid 24 has been welded to casing 12. In its fully assembled condition, the casing 12 is provided with a closure means 28 hermetically secured in opening 26 to seal the cell. A cathode terminal lead 30 is electrically insulated from lid 24 and casing 12 by a glass-to-metal seal 32, as is well known to those skilled in the art. It should be pointed out that as described herein casing is useful with an electrochemical cell according to both the prior art (FIGS. 2 and 3) and according to the present invention (FIGS. 4 and 5).

Figure 2:
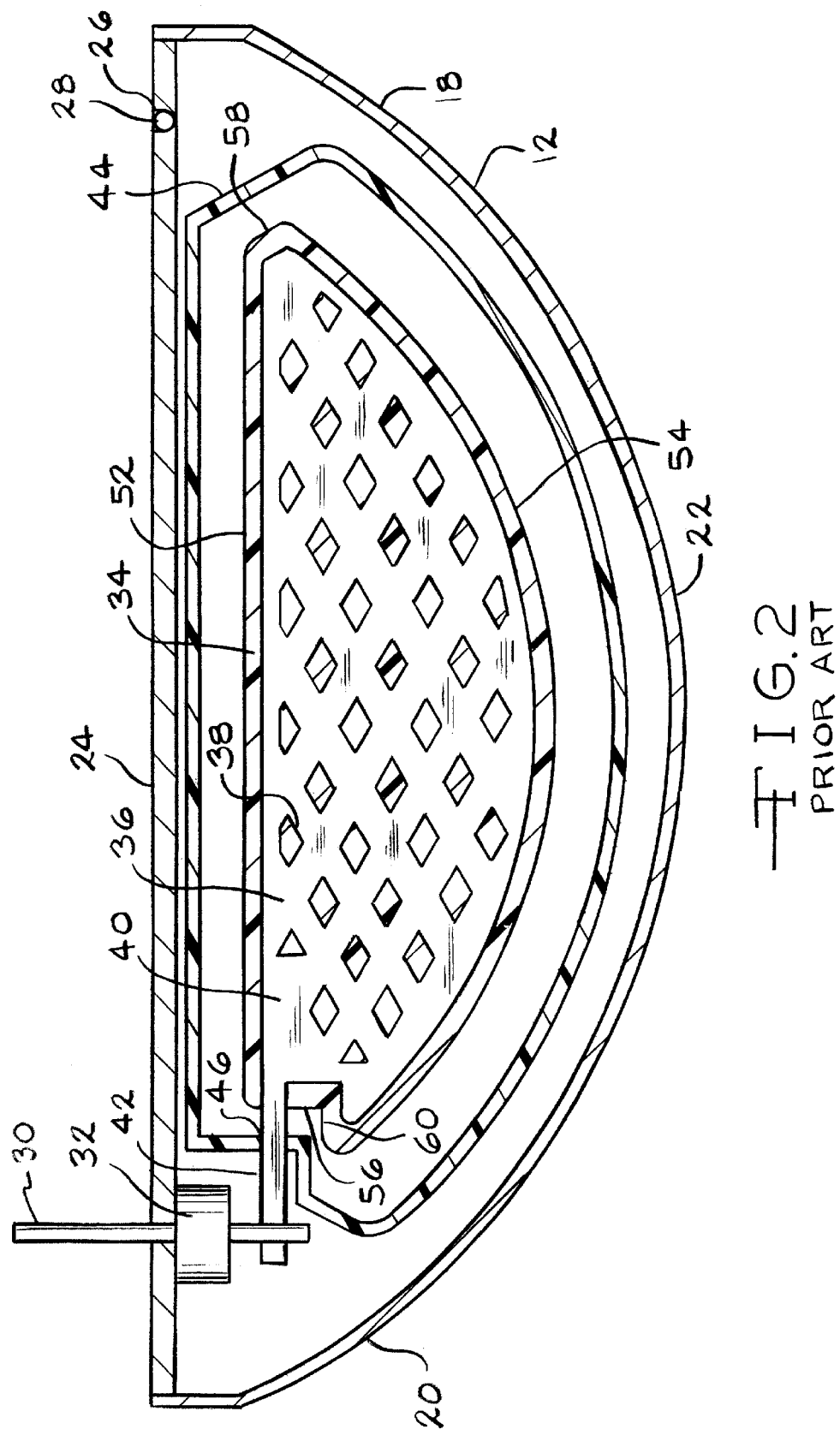
FIG. 2 is an enlarged cross-sectional side elevation view of a prismatic cell according to the prior art.
Figure 3:
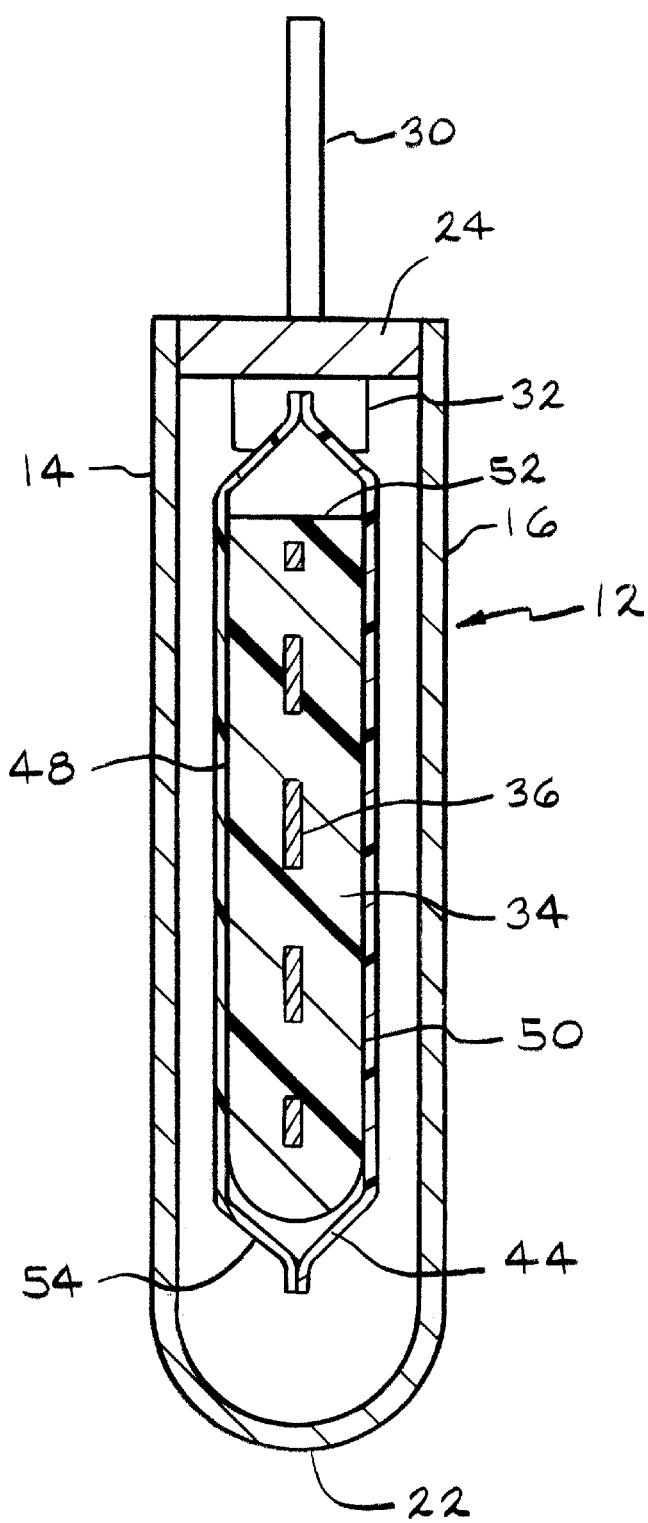
FIG. 3 is an enlarged cross-sectional end elevation view of the prismatic cell shown in FIG. 2.

FIGS. 2 and 3 are cross-sectional views of a conventional or prior art construction for a prismatic cell housed inside the casing 12. For the sake of clarity the anode electrode is not shown. However, it should be understood that in a typical prismatic cell design, a central cathode electrode 34 is flanked on both of its major sides by anode plates. The cathode electrode 34 is connected to the terminal lead 30 and the pair of anode plates flanking the cathode are connected to the casing 12 in a case-negative design. Such a cell construction is shown in U.S. Pat. No. 5,250,373 to Muffoletto et al., which is assigned to the assignee of the present invention and incorporated herein by reference.

The current collector 36 for the cathode electrode comprises an apertured grid 38, an internal connection tab 40 in the form of a land that is coplanar and surrounded on three sides by the grid 38, and an integral external connection tab 42. External connection tab 42 is an outwardly extending continuation of the internal tab 40. In FIG. 2, the terminal lead 30 is shown connected to the external tab 42 for the cathode electrode, however, the lead 30 can be directly connected to the cathode current collector 36 at any contact point along the full extent of the internal tab 40 and the external tab 42. This construction is more thoroughly described in U.S. Pat. No. 5,750,286 to Paulot et al., which is assigned to the assignee of the present invention and incorporated herein by reference.

As shown in FIGS. 2 and 3, the cathode 34 is enclosed in a separator 44 that substantially surrounds and covers the electrode except for an opening 46. The separator opening 46 provides for passage of the connection tab 42 there through to make contact with the terminal lead 30.

According to conventional practice, the separator 44 is of electrically insulative material. The separator material also is chemically unreactive with the anode and cathode active materials and both chemically unreactive with and insoluble in the electrolyte. In addition, the separator material has a degree of porosity sufficient to allow flow there through of the electrolyte during electrochemical reaction of the cell. Finally, the separator 44 is shaped as an envelope covering the cathode 34 and sized to accommodate electrode swelling. For example, it is known that the cathode in a Li/CF$_x$ cell swells during discharge depending upon the current density used for discharge. Under a 1K Ohm load, a CF$_x$ cathode can exhibit a 30% increase in cathode thickness, an 8% increase in height and a 6% increase in length. Under a heavier 499 Ohm load, a similarly sized CF$_x$ cathode may exhibit as much as a 60% increase in its thickness, a 15% increase in its height, and a 10% increase in its length.

Turning to FIG. 3, the cathode electrode 34 and separator envelope 44 are shown housed inside the casing 12. The cathode 34 has a solid body in the form of an active mixture pressed or calendared against the cathode current collector 36. The cathode 34 is provided with opposing major side walls 48 and 50 shaped to conform to the front and back side walls 14 and 16 of the casing 12 and connected by a generally planar top wall 52 and a curved bottom wall 54. The top wall 52 resides adjacent to the lid 24 while the bottom wall 54 is curved to match the curved bottom wall 22 of the casing 12. The cathode further has opposed front and back walls 56 and 58 extending to and meeting with the cathode side walls 48 and 50. The front wall 56 extends to the top wall 52 and meets a step 60 which forms into the curved bottom wall 54 while the back wall 58 meets both the top and bottom walls 52 and 54. The cathode side walls 48 and 50 are parallel to the spaced apart front and back walls 14 and 16 of the casing 12.

In the completed cell, anode plates are disposed between the cathode side walls 48 and 50 and the respective casing side walls 14 and 16, however, as previously discussed, the anode plates are not shown for the sake of clarity. Thus, the cathode 34 has a thickness defined by the distance between side walls 48 and 50, a height defined by the distance between the top wall 52 and the lowest point of the curved bottom wall 54 spaced from the top wall, and a length defined by the distance between the front wall 56 including the step 60 and the back wall 58.

As shown in FIGS. 2 and 3, the separator 44 is spaced in a generally uniform manner about the entire perimeter of the cathode. In that respect, the separator 44 is substantially spaced a like amount or equidistant from the cathode 34 at the top wall 52 adjacent to the lid 24, at the front wall 56 and step 60, at the bottom wall 54 adjacent to the curved bottom wall 22 and at the end wall 58. According to conventional practice, the prior art equidistant clearance is about 0.05 inches to about 0.07 inches spaced from the entire perimeter of the cathode 34. The perimeter of the cathode is defined by the top wall 52 and the curved bottom wall 54 extending to and meeting with the front and back walls 56 and 58 including the step 60. The separator is generally not spaced from the cathode adjacent to the side walls 48 and 50 as this is where the anode is positioned in close electrochemical association with the cathode.

The prior art design is adequate when there is substantial clearance between the separator 44 and the welding zones for the casing, for example where the lid 24 is hermetically secured to the casing. This substantial clearance prevents melting of the separator material as the lid is welded to the casing 12. The problem is that the unused space between the top wall 52 of the cathode 44 and the lid 24 detracts from the volumetric efficiency of the cell. In other words, if the size of the prior art cathode 44 is increased to take advantage of this unused space, the internal volume inside the cell occupied by active components, whether of the anode or the cathode, or both, is increased. However, when there is inadequate space between the separator 44 and the casing lid 24, the separator material may melt or become compromised during welding operations. This happens because the lid 24 and casing 12 are relatively good thermal conductors. Typically, the separator is of a polymeric material and melting is a concern.

FIGS. 4 and 5 illustrate the present invention cell wherein the casing 12 houses a cathode electrode, generally designated 100, in electrical association with an anode electrode. In these figures, the anode electrode is shown in order to provide a complete and accurate description of the present invention. Cathode 100 comprises plates 102 and 104 pressed together and bonded against a cathode current collector 36 while the anode comprises anode plates 108 and 110 in operative contact with the respective cathode plates 102 and 104. The cathode current collector 36 is provided with an operational grid 38, an internal connection tab 40 and an integral external connection tab 42. As previously described with respect to the prior art cell shown in FIGS. 2 and 3, the tabs 40 and 42 provide for connection of a terminal lead 30 along the entire extent thereof.

According to the present invention, a separator 112 is provided in a purposefully loosely-spaced relationship with the cathode 100. In this embodiment, the cathode 100 has a shape similar to that of the prior art cathode 34 shown in FIGS. 2 and 3 except it has been modified somewhat to bring its top wall closer to the casing lid 24. This helps to improve the volumetric efficiency of the cell. In that respect, the cathode 100 is provided with opposed major side walls 114 and 116 shaped to conform to the front and-back side walls 14 and 16 of the casing 12 and connected by a generally planar top wall 80 and a curved bottom wall 82. The top wall 118 resides adjacent to the lid 24 while the bottom wall 120 is curved to match the curved bottom wall 22 of the casing 12. The cathode 100 further has an opposed front wall 122 and an angled back wall 124 extending to and meeting with the cathode side walls 114 and 116. The front wall 122 extends to the cathode top wall 118 and meets a step 126 which extends to an angled side wall 128 forming into the curved bottom wall 120 while the angled back wall 124 meets both the cathode top and bottom walls 118 and 120.

The cathode side walls 114 and 116 are parallel to the spaced apart front and back walls 14 and 16 of the casing 12.

Thus, the cathode 100 of the present invention cell has a thickness defined by the distance between side walls 114 and 116, a height defined by the distance between the top wall 118 and the lowest point of the curved bottom wall 120 spaced from the top wall, and a length defined by the distance between the angled side wall 128 where it meets the bottom wall 120 and the angled back wall 124. In order to prevent internal short circuit conditions, the separator 112 covers the cathode 100 about its body including the periphery defined by the top wall 118 and the curved bottom wall 120 extending to and meeting with the front and back walls 122, 128 and 124 and the step 126.

The present invention cell further includes an anode comprising a unitary conductive member 130 which serves as the anode current collector and is fabricated from a thin sheet of metal, preferably nickel, having a pair of wing-like sections 132 and 134 joined by an intermediate web section 136. The preferred alkali metal for the anode is lithium. The lithium anode elements 108 and 110 are in pressure bonded contact with and carried by corresponding ones of the current collector wing sections 132 and 134, respectively, which are of a mesh formation to facilitate adherence to the lithium anode elements 108, 110.

In that respect, the cathode 100 of the present invention cell is shaped similar to the cathode 34 according to the prior art except the distance between the top wall 118 of the cathode 100 is much closer to the lid 24 than is the top wall 52 of the prior art cell. This provides the present invention cell with increased active material inside a casing of equal volume, which benefits the cell's volumetric efficiency. The separator 112 is in a relatively closely spaced relationship with the cathode 100 at the top wall 118 and adjacent to the lid 24 for the casing. This closely spaced relationship for the separator 112 is indicated as the distance 136 in FIG. 5. As is the case with the prior art cell shown in FIGS. 2 and 3, this closely spaced relationship ranges from about 0.05 inches to about 0.07 inches. However, in order to accommodate swelling of the cathode as the cell is discharged, the separator 112 is in a relatively loosely spaced relationship with the cathode 100 in that part covering the front wall 122, the step 126, the angled side wall 128, the curved bottom wall 120 and the angled back wall 124. This loosely spaced relationship for the separator is indicated as distance 138 in FIG. 5, and ranges from about 0.1 inches to about 0.3 inches.

It shall be understood by those skilled in the art that the embodiment of the present invention shown in FIGS. 4 and 5 is by way of example only. In a broader sense, the separator is provided in a loosely spaced relationship with those portions of the cathode that are sufficiently distant from zones of potential heat compromise so that there is little, if any, chance of melting the separator, such as during welding the lid 24 to the casing 12. However, as discussed with respect to the prior art cell, the separator is generally in a closely spaced relationship with areas directly between or intermediate the cathode in operative contact with the anode, such as cathode plates 102 and 104 in operative contact with the anode plates 108 and 110. Also, the specific design of a cell will often dictate the extent and location of the separator being in a loosely spaced relationship with the electrode that it covers. In an optimum situation, there is only as much loose space between a separator and the covered electrode in a newly built cell as is necessary to accommodate complete discharge of the cell throughout its useful life. Any excess separator spacing is preferably taken up by electrode active material or non-active components that are needed for proper cell functioning. This balance helps to optimize the cell's volumetric efficiency.

To construct an anode-cathode subassembly according to the present invention, the anode wing sections 132 and 134 with the associated anode lithium elements 108 and 110 are folded relative to the web section 136 toward each other and in a manner to place the lithium anode elements in operative contact with the oppositely directed major surfaces of the opposed sides 114 and 116, respectively, of the cathode plates. In particular, lithium anode element 108 is in operative electrochemical association with the cathode plate 102 through a portion 140 of the sheet of separator 112. Similarly, lithium anode element 110 is in operative electrochemical association with cathode plate 104 through another portion 142 of the separator 112. Shielding and insulating sheets (not shown) are positioned between the web 136 and the cathode electrode 100. The terminal lead 30 is then connected to the cathode current collector 36 extending through the header assembly comprising the glass to metal seal 32 fitted in the lid 24. The anode-cathode subassembly is positioned inside the casing 12 and the lid 24 is then hermetically sealed to the casing 12 such as by welding.

The cell is completed by a liquid electrolyte provided in the casing and sealed therein by the provision of the closure means 28 welded in the fill opening to hermetically close the cell. The lead 30 is the positive electrical terminal connected to the cathode electrode. With anode electrode in operative contact with the conductive casing 12 through the web section 136 of the anode current collector in electrical contact therewith, the cell of the present invention is in a case-negative electrical configuration.

By way of example, in the illustrative cell of the present invention, the anode is of an alkali metal contacted to a nickel current collector. The cathode active material is preferably comprised of a metal, a metal oxide, a mixed metal oxide, a metal sulfide, a carbonaceous material, or a fluorinated carbon material, and the cathode current collector 36 is fabricated from a relatively thin sheet of metal selected from the group consisting of nickel, aluminum, stainless steel, mild steel and titanium, with titanium being preferred.

In the case of a carbonaceous active material, the carbonaceous material preferably is prepared from carbon and fluorine, and includes graphitic and non-graphitic forms of carbon, such as coke, charcoal or activated carbon. The fluorinated carbon is represented by the formula $(CF_x)_n$ wherein x varies between about 0.1 to 0.9 and preferably between 0.5 and 1.2, and $(C_2F)_n$ wherein the "n" refers to the number of monomer units, which can vary widely. The preferred cathode active mixture comprises $CF_x$ combined with a discharge promoter component such as acetylene black, carbon black and/or graphite. Metallic powders such as nickel, aluminum, titanium, and stainless steel in powder form are also useful as conductive diluents when mixed with the cathode active mixture of the present invention. If required, a binder material can also be used. Preferred binders comprise fluororesins in powdered form such as powdered polytetrafluoroethylene (PTFE).

Exemplary mixed metal oxide materials include silver vanadium oxide (SVO) cathode material as described in U.S. Pat. Nos. 4,310,609 and 4,391,729 to Liang et al., or copper silver vanadium oxide (CSVO) as described in U.S. Pat. Nos. 5,472,810 and 5,516,340 to Takeuchi et al., all assigned to the assignee of the present invention, the disclosures of which are hereby incorporated by reference. The SVO and CSVO materials are also preferably mixed with a discharge promoter component and a binder material. In the case of the cathode comprised of a carbonaceous active material, the preferred electrolyte is 1.0 M to 1.4 M $LiBF_4$ in y-butyrolactone. A cell having a metal-containing cathode active material is preferably activated with an electrolyte of 1.0 M to 1.4 M $LiAsF_6$ or $LiPF_6$ in a 50:50 mixture of, by volume, 1,2-dimethoxyethane and propylene carbonate. The terminal lead 30 is of molybdenum, titanium, or aluminum and separator 112 is of polyolefinic material or of a fluoropolymeric material provided in either a woven or non-woven construction or combinations thereof. The glass material for the glass-to-metal seal is of CABAL 12 TA-23, FUSITE 425 or FUSITE 435 hermetic sealing glass, and the fill plug for the fill ferrule is of stainless steel, titanium or nickel.

The electrochemical cell of the present invention can also be constructed having a case-positive electrical configuration provided by placing the cathode parts in contact with the conductive cell casing.

Thus, the novel separator assembly of the present invention is readily incorporated into alkali metal/solid cathode or alkali metal/oxyhalide primary electrochemical cells of both solid cathode and liquid electrolyte types. Furthermore, the present separator assembly is readily incorporated into secondary electrochemical systems. Exemplary secondary cells include a carbonaceous anode and a lithium-retentive cathode, such as $LiCoO_2$ activated with an electrolyte having 0.8 to 1.5 molar $LiAsF_6$ or $LiPF_6$ dissolved in an equilibrated mixture of dimethyl carbonate, ethyl methyl carbonate, diethyl carbonate and ethylene carbonate. Such a secondary chemistry is more thoroughly described in U.S. patent application Ser. No. 09/669,936, filed Sep. 26, 2000, now abandoned, which application is assigned to the assignee of the present invention and incorporated by reference herein.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. An electrochemical cell, which comprises:
    a) a casing comprising a container having a container side wall extending to an edge surrounding a container opening closed by a lid secured to the edge;
    b) a first electrode provided inside the casing;
    c) a second, counter electrode provided inside the casing in electrical association with the first electrode;
    d) a separator enveloping the first electrode about its entire periphery, wherein the separator is disposed in a relatively loosely spaced relationship with the first electrode except directly adjacent to the container edge forming the container opening closed by the lid secured thereto where the separator is in a relatively closely spaced relationship; and
    e) an electrolyte provided in the casing to active the first and second electrodes.

2. The electrochemical cell of claim 1 wherein the relatively closely spaced relationship ranges from about 0.05 inches to about 0.07 inches.

3. The electrochemical cell of claim 1 wherein the relatively loosely spaced relationship ranges from about 0.1 inches to about 0.3 inches.

4. The electrochemical cell of claim 1 wherein the container comprises spaced apart side walls joined by an intermediate wall having a generally radius curved shape, and wherein the side walls and the intermediate wall extend to the container opening.

5. The electrochemical cell of claim 1 wherein the first electrode is a cathode and the second electrode is an anode.

6. The electrochemical cell of claim 5 wherein the cathode has spaced apart major sides extending to an intermediate radius curved edge, and wherein the anode flanks the cathode adjacent to its major sides.

7. The electrochemical cell of claim 1 wherein the closely spaced relationship ranges from about 0.05 inches to about 0.07 inches.

8. The electrochemical cell of claim 1 wherein the loosely spaced relationship ranges from about 0.1 inches to about 0.3 inches.

9. The electrochemical cell of claim 1 of a lithium/$CF_x$ chemistry.

10. The electrochemical cell of claim 1 of a lithium/silver vanadium oxide chemistry.

11. The electrochemical cell of claim 1 of a carbonaceous anode material/lithium-retentive cathode active material.

12. An electrochemical cell, which comprises:
    a) a casing comprising a container having a container side wall extending to an edge surrounding a container opening closed by a lid secured to the edge;
    b) an anode electrode provided inside the casing;
    c) a cathode electrode provided inside the casing in electrical association with the anode electrode;
    d) a separator enveloping at least one of the anode electrode and the cathode electrode about their entire peripheries, wherein the separator is disposed in a relatively loosely spaced relationship with the at least one electrode except directly adjacent to the container edge forming the container opening closed by the lid secured thereto where the separator is in a relatively closely spaced relationship; and
    e) an electrolyte provided in the casing to activate the anode and the cathode electrodes.

13. The electrochemical cell of claim 12 wherein the closely spaced relationship ranges from about 0.05 inches to about 0.07 inches.

14. The electrochemical cell of claim 12 wherein the loosely spaced relationship ranges from about 0.1 inches to about 0.3 inches.

15. A method for providing an electrochemical dell, comprising the steps of:
    a) providing a container having a container side wall extending to an edge surrounding a container opening;
    b) providing a first electrode;
    c) disposing the first electrode inside a separator enveloping the first electrode about its entire periphery, wherein a first portion of the separator is disposed in a relatively loosely spaced relationship with the first electrode while a second portion of the separator is disposed in a relatively closely spaced relationship with the first electrode;
    d) electrically associating a second, counter electrode with the first electrode to thereby provide an electrode assembly;
    e) securing a lid to the edge of the container surrounding the container opening, wherein the separator being in the relatively closely spaced relationship is directly adjacent to the container edge forming the container opening closed by the lid secured thereto and wherein the relatively loosely spaced relationship is other than adjacent to the lid; and
    f) activating the electrode assembly with an electrolyte provided in the casing.

* * * * *